(12) United States Patent
Creasey et al.

(10) Patent No.: US 11,767,640 B2
(45) Date of Patent: *Sep. 26, 2023

(54) PAPER ENHANCING COMPOSITIONS, USES THEREOF AND ENHANCED PAPER

(71) Applicant: ITI Technologies, Inc., Leland, NC (US)

(72) Inventors: David H. Creasey, Leland, NC (US); Samuel Horace McCall, IV, Leland, NC (US)

(73) Assignee: ITI Technologies, Inc., Leland, NC (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/588,712

(22) Filed: Jan. 31, 2022

(65) Prior Publication Data
US 2022/0154405 A1 May 19, 2022

Related U.S. Application Data

(62) Division of application No. 16/896,328, filed on Jun. 9, 2020, now abandoned.

(51) Int. Cl.
| | |
|---|---|
| *D21H 21/36* | (2006.01) |
| *D21H 21/18* | (2006.01) |
| *D21H 21/24* | (2006.01) |
| *D21H 19/02* | (2006.01) |
| *D21H 17/06* | (2006.01) |
| *D21H 19/38* | (2006.01) |
| *D21H 17/67* | (2006.01) |
| *D21H 23/04* | (2006.01) |

(52) U.S. Cl.
CPC ............ *D21H 21/36* (2013.01); *D21H 17/675* (2013.01); *D21H 19/02* (2013.01); *D21H 19/385* (2013.01); *D21H 21/18* (2013.01); *D21H 21/24* (2013.01); *D21H 23/04* (2013.01)

(58) Field of Classification Search
CPC ...... D21H 21/36; D21H 17/675; D21H 19/02; D21H 19/385; D21H 21/18; D21H 21/24; D21H 23/04; D21H 17/67; D21H 19/36; D21H 19/38

See application file for complete search history.

(56) References Cited

U.S. PATENT DOCUMENTS

| | | | | |
|---|---|---|---|---|
| 3,713,963 | A | * | 1/1973 | Hager ..................... D21H 17/70 162/183 |
| 5,989,595 | A | | 11/1999 | Cummins |
| RE41,109 | E | | 2/2010 | Cummins |
| 8,012,511 | B1 | | 9/2011 | Cummins |
| 8,691,285 | B2 | | 4/2014 | Cummins |
| 10,264,793 | B2 | | 4/2019 | Meccia |
| 10,662,093 | B2 | | 5/2020 | Nicholas |

(Continued)

*Primary Examiner* — Shuangyi Abu Ali
(74) *Attorney, Agent, or Firm* — Steven A. Fontana; Maynard Nexsen PC; E. Eric Mills

(57) ABSTRACT

The present invention provides certain paper enhancing compositions, typically aqueous compositions, for use in the manufacture and coating of paper, and paper products. The paper enhancing compositions provide certain paper processing advantages and distinct final paper product characteristics. The present invention further provides carbonate enhancing composition useful for preparing enhanced carbonate compositions used in the paper manufacturing processes.

18 Claims, 6 Drawing Sheets

(56) References Cited

U.S. PATENT DOCUMENTS

2010/0126684 A1 5/2010 Cheng
2017/0101740 A1 4/2017 Harrington
2017/0280728 A1 10/2017 Dautreiul

* cited by examiner

PAPER ENHANCING COMPOSITIONS, USES THEREOF AND ENHANCED PAPER

CROSS-REFERENCE TO RELATED APPLICATIONS

This application is a divisional application of U.S. patent application Ser. No. 16/896,328 filed on Jun. 9, 2020, which is related to U.S. patent application Ser. No. 16/745,846 entitled "Plastic Modifying Compositions and Enhanced Carbonate Compositions" filed on Jan. 17, 2020; the entire disclosure of which is incorporated herein by reference.

BACKGROUND

The present invention relates to paper enhancing compositions useful for the manufacture of paper, paper products, paperboard and paperboard products, and coated paper and paperboard and products made therefrom including, for example and without limitation, cardboard and cardboard products. Also provided are enhanced carbonate compositions comprising at least one carbonate and at least one carbonate enhancing composition.

Although large-scale pulp-based paper processing methods have been established since the 1840's, a variety of substrates have been used and continue being used over the millennia including, for example and without limitation, cotton, silk, bamboo, Phragmites (e.g., common reeds) and traditional hard and soft wood sources. The use of such substrates each have particular challenges and techniques, and each typically use one or more fillers that extend the use of substrate(s), frequently reducing cost of the final product, while imparting specific and desired properties to the final product. Process development, particularly processes for continued cost reduction while maintaining and improving desired and/or new qualities to the final paper products continue. Accordingly, the present disclosure provides certain aspects relative to such continued development and improvement of a variety of products and processes for the processing of coated and uncoated paper and the coating of paper.

As further reviewed herein, once paper is manufactured, additional challenges exist when coating paper for a variety of uses. As such, the present invention also provides various aspects related to compositions and methods related to the preparation and processing of paper and paper products post manufacture of paper including, for example, a variety of coatings for various purposes.

SUMMARY

One aspect of the present invention provides a paper forming mixture comprising a paper making fiber and at least one carbonate enhanced composition of the present invention. Addition of such carbonate enhanced mixture is typically, without limitation, added to the paper making process at the wet-end.

Further provided is a paper forming mixture comprising a pulp-based mixture of pulp and at least one carbonate enhanced composition of the present invention.

An additional aspect of the present invention provides a paper forming mixture comprising a pulp-based mixture of pulp and at least one carbonate enhanced composition of the present invention, wherein the amount of calcium carbonate filler is at least five percent (5%) greater than the amount calcium carbonate fill typically added to a given paper type. For example, and without limitation, as reviewed in part above, for a paper type typically using 10-30% fill, the amount of fill that can be added to the paper forming wet mixture will equal at least 31.5% of the total wet mixture. This increase in calcium carbonate fill amount can be used for any paper type well known to the skilled artisan.

A further aspect of the present invention provides for a method of modifying the zeta potential of calcium carbonate used in a paper making process comprising the addition of at least one carbonate enhanced composition of the present invention to the wet-end of a paper making process. As used relative to the zeta potential, such modification can be an increase or decrease of the zeta potential, but typically is an increase in the zeta potential as used herein.

More particularly, the present invention also provides a method of modifying the zeta potential of calcium carbonate used in a pulp-based paper making process comprising the addition of at least one carbonate enhanced composition of the present invention to the wet-end of a paper making process.

An additional aspect of the present invention provides for antimicrobial paper, having a multitude of uses, comprising paper prepared by the addition of at least one carbonate enhanced composition of the present invention to the wet-end of a paper making process. As used herein, the term "antimicrobial activity" means the inhibition of microbes.

The present invention further provides a paper enhancing composition comprising water, at least one solubility enhancing aqueous composition, sodium hydroxide, copper sulfate and, optionally, at least one surfactant selected from the group consisting of non-ionic surfactants and/or anionic surfactants.

An additional aspect of the present invention provides an aqueous or, substantially aqueous, paper enhancing composition (aqueous notwithstanding the potential for copper sulfate to not have completely dissolved in the paper enhancing composition) comprising an aqueous phase comprising a solubility enhancing aqueous composition wherein 1 part of a first solution is added to about 15 to about 20 parts of water, frequently deionized water, to form a second solution; sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition. As used herein, the term "aqueous paper enhancing composition" also includes any such composition that is substantially aqueous as indicated herein.

A further aspect of the present invention further comprises the addition of an acid or base to adjust the pH to a pH from about 2.5 to about 3.5 to a paper enhancing composition of the present invention.

The present invention further provides a method of increasing at least one of paper tensile strength, bond strength and burst strength compared to paper prepared without the addition of at least one paper enhancing composition comprising the addition of at least one paper enhancing composition to the wet-end of the paper making process.

Another aspect of the present invention provides a method for decreasing the interstitial pore size between and among paper fibers in a wet-end-paper making process compared to paper prepared without the addition of at least one paper enhancing composition comprising the addition of at least one paper enhancing composition to the wet-end of the paper making process.

An additional aspect of the present invention provides a method for increasing paper density compared to paper prepared without the addition of at least one paper enhancing composition comprising the addition of at least one paper enhancing composition to the wet-end of the paper making process.

A further aspect of the present invention provides for paper having antimicrobial properties comprising paper prepared using at least one paper enhancing composition during the wet-end process stage of paper making.

Also provided herein is a method of modifying the zeta potential of calcium carbonate when used in the paper making process comprising applying at least one aqueous paper enhancing composition during the wet-end stage of paper production.

Further provided is a method of modifying the zeta potential of calcium carbonate when used in a pulp-based paper making process comprising applying at least one aqueous paper enhancing composition during the wet-end stage of paper production.

Another aspect of the present invention provides for enhanced paper comprising paper having applied during the wet press stage of paper production at least one aqueous enhancing paper composition.

Further Provided Herein are the Following Methods:

A method of enhancing paper comprising applying at least one aqueous paper enhancing composition during the wet press stage of paper production.

A method of increasing at least one of the group consisting of tensile strength, bond strength and burst strength in paper compared to the respective tensile strength, bond strength and burst strength of paper untreated with an aqueous paper enhancing composition comprising applying at least one aqueous paper enhancing composition during the wet press stage of paper production.

A method of modifying the zeta potential of calcium carbonate when used in the paper making process comprising applying at least one aqueous paper enhancing composition during the wet press stage of paper production.

More particularly, the present invention also provides a method of modifying the zeta potential of calcium carbonate used in a pulp-based paper making process comprising applying at least one aqueous paper enhancing composition during the wet press stage of paper production.

A method of increasing at least one of the group consisting of paper tensile strength, bond strength and burst strength of paper comprising applying at least one aqueous paper enhancing composition during the wet press stage of paper production compared to paper untreated with an aqueous paper enhancing composition without an increase in caliper pose.

Further provided is antimicrobial paper, having a multitude of uses, comprising paper prepared by the application of at least one aqueous paper enhancing composition of the present invention during the wet press stage of paper production.

Another aspect of the present invention provides for a paper coating comprising at least one aqueous paper enhancing composition.

An additional aspect provides for paper coated with at least one aqueous paper enhancing composition.

Another aspect of the present invention provides a method of increasing at least one of the group consisting of paper tensile strength, bond strength and burst strength of paper comprising the application of a coating to paper comprising at least one paper enhancing composition of the present invention.

An additional aspect of the present invention provides for a method of providing at least one of protection from fingerprints and other blemishes, help prevent metallic inks from tarnishing, and provide paper surfaces that can be written on with multiple media (including, without limitation, pencil, pen, ink jet printers, laser jet printers off-set printers and the like) comprising the application of a coating to paper comprising at least one paper enhancing composition of the present invention.

A further aspect of the present invention provides for a method of providing improvement of at least one of protection from fingerprints and other blemishes, help prevent metallic inks from tarnishing, and provide paper surfaces that can be written on with multiple media (including, without limitation, pencil, pen, ink jet printers, laser jet printers off-set printers and the like) compared to paper coatings not including the application of at least one aqueous paper enhancing composition of the present invention comprising the application of a coating to paper comprising at least one paper enhancing composition of the present invention.

Accordingly, another aspect of the present invention provides for coated paper having antimicrobial activity comprising paper coated with at least one aqueous paper enhancing composition of the present invention.

An additional aspect of the present invention provides for paper having antimicrobial properties comprising paper coated with at least one aqueous paper enhancing composition of the present invention.

Another aspect of the present invention provides for a method of preparing paper having antimicrobial activity comprising applying as a coating to paper at least one aqueous paper enhancing composition of the present invention to said paper.

Further provided is antimicrobial paper, having a multitude of uses, comprising paper prepared by the application of a coating of at least one aqueous paper enhancing composition of the present invention during the wet press stage of paper production.

Another aspect of the present invention provides a method of extending the shelf-life of perishable foodstuff comprising placing such foodstuff in contact with paper coated with at least one aqueous paper enhancing composition of the present invention. Such shelf-life can be extended for at least 24 hours, providing substantial value to providers of such perishable foodstuff.

Further provided is a method for preparing paper for medical and industrial protective uses comprising applying as a coating to paper at least one aqueous paper enhancing composition.

An additional aspect provides a method of preparing paper for use in masks for mammalian, particularly human, use comprising applying as a coating at least one aqueous paper enhancing composition.

An additional aspect of the present invention provides a carbonate enhanced composition comprising at least one carbonate and at least one carbonate enhancing composition.

Other aspects of the present invention provide a variety of methods of using a carbonate enhanced composition of the present invention to a variety of intermediate and final products as further described herein below.

An additional aspect of the present invention provides a carbonate enhancing composition comprising an aqueous phase comprising a solubility enhancing aqueous composition wherein 1 part of a first solution is added to about 15 to about 20 parts of water to form a second solution; sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition; optionally comprising the addition of at least one acid or at least one base to adjust the final composition pH to a pH of about 2.5 to about 3.5.

Another aspect of the present invention provides a carbonate enhancing composition comprising an aqueous phase comprising a solubility enhancing aqueous composition wherein 1 part of a first solution is added to about 15 to about 20 parts of water to form a second solution and sodium hydroxide solution having a concentration of about 5% to about 7.5% volume/volume of the total aqueous phase volume of the composition; and copper sulfate having a concentration from about 20 percent to about 26 percent mass/volume of the total aqueous phase volume of the composition, optionally comprising the addition of at least one acid or at least one base to adjust the final composition pH to a pH of about 2.5 to about 3.5.

An additional aspect of the present invention provides an antimicrobial composition comprising at least one composition selected from the group consisting of at least one carbonate enhanced composition and at least one carbonate enhancing composition, wherein the carbonate enhancing composition is optionally aqueous or substantially aqueous.

A further aspect of the present invention provides a product requiring at least one carbonate as an element in the manufacture thereof comprising at least, in part, at least one carbonate enhanced composition used in the manufacture of such product.

An additional aspect of the present invention provides an antimicrobial composition comprising at least one carbonate enhanced composition.

BRIEF DESCRIPTION OF THE DRAWINGS

Features of the present invention will be more fully appreciated by reference to the following detailed description when taken in conjunction with the following drawings in which.

Figure 1:
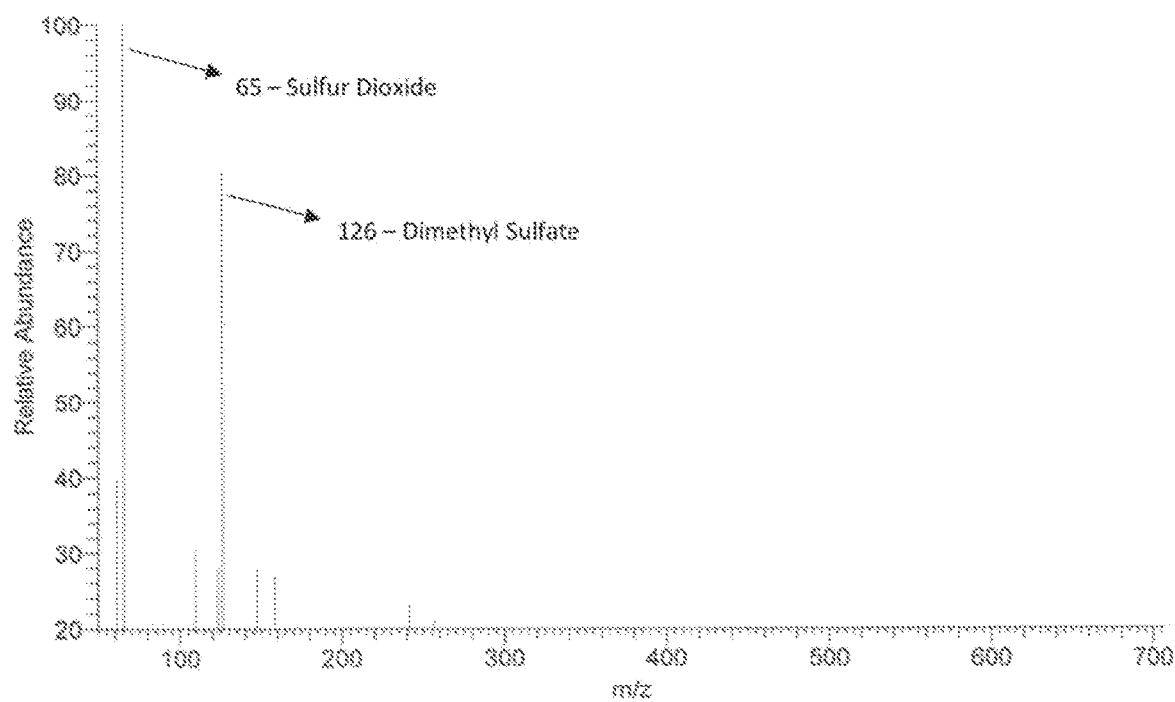
FIG. 1. depicts a low resolution spectrogram with 1 part reaction unit to 5 parts total.
Figure 2:
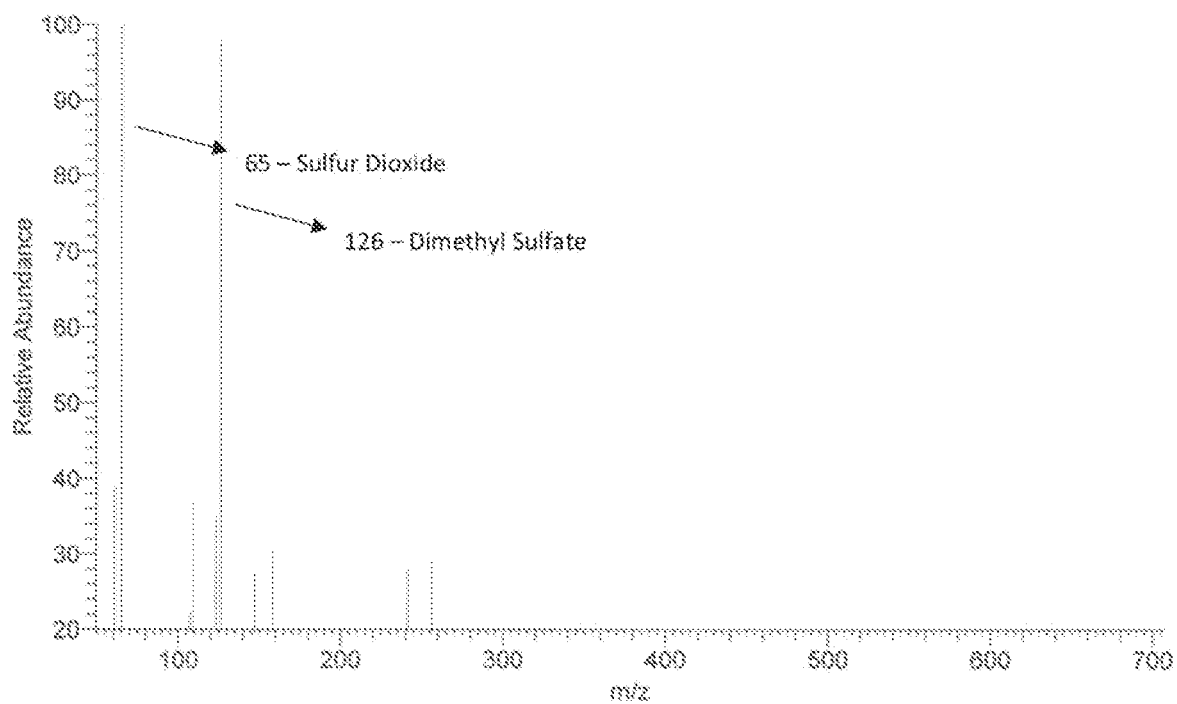
FIG. 2. depicts a high resolution spectrogram with 1 part reaction unit to 5 parts total.
Figure 3:
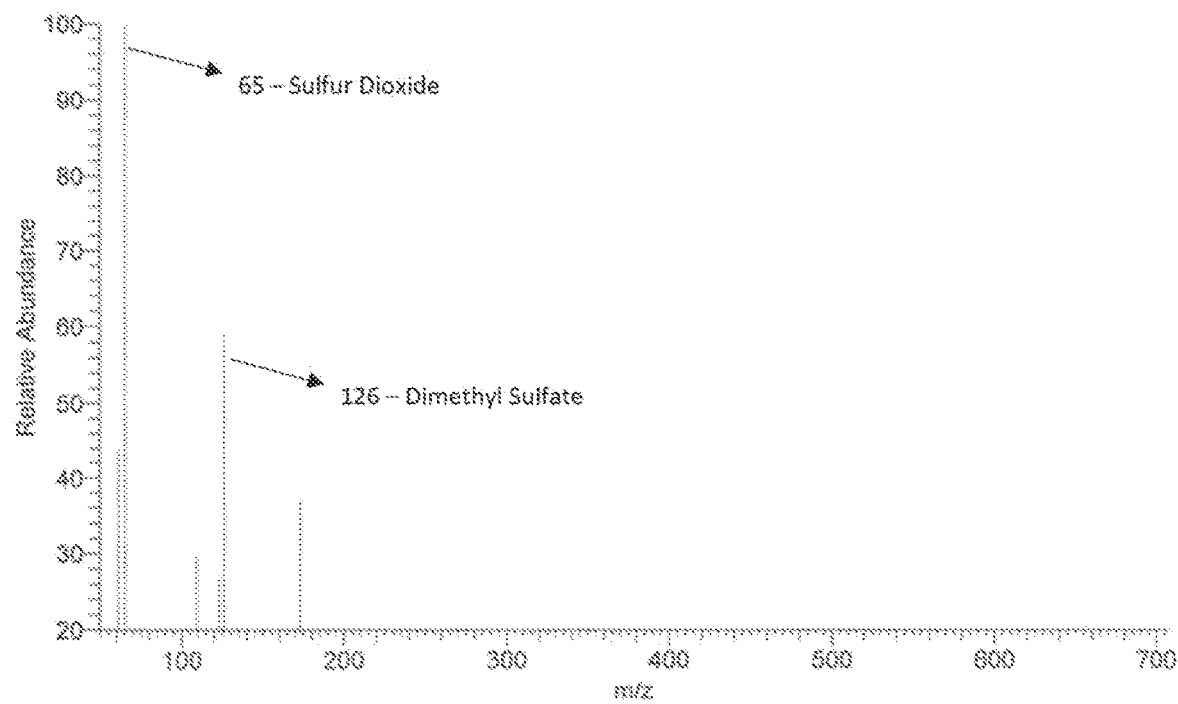
FIG. 3. depicts a low resolution spectrogram with 1 part reaction unit to 10 parts total.
Figure 4:
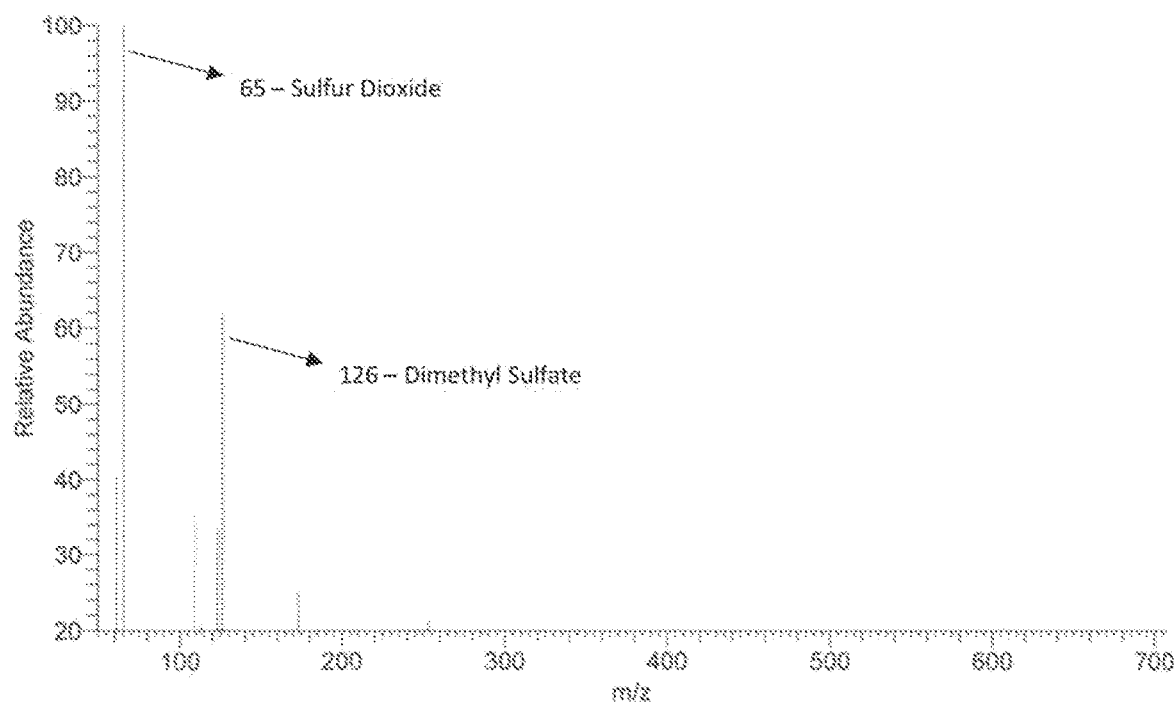
FIG. 4. depicts a high resolution spectrogram with 1 part reaction unit to 10 parts total.
Figure 5:
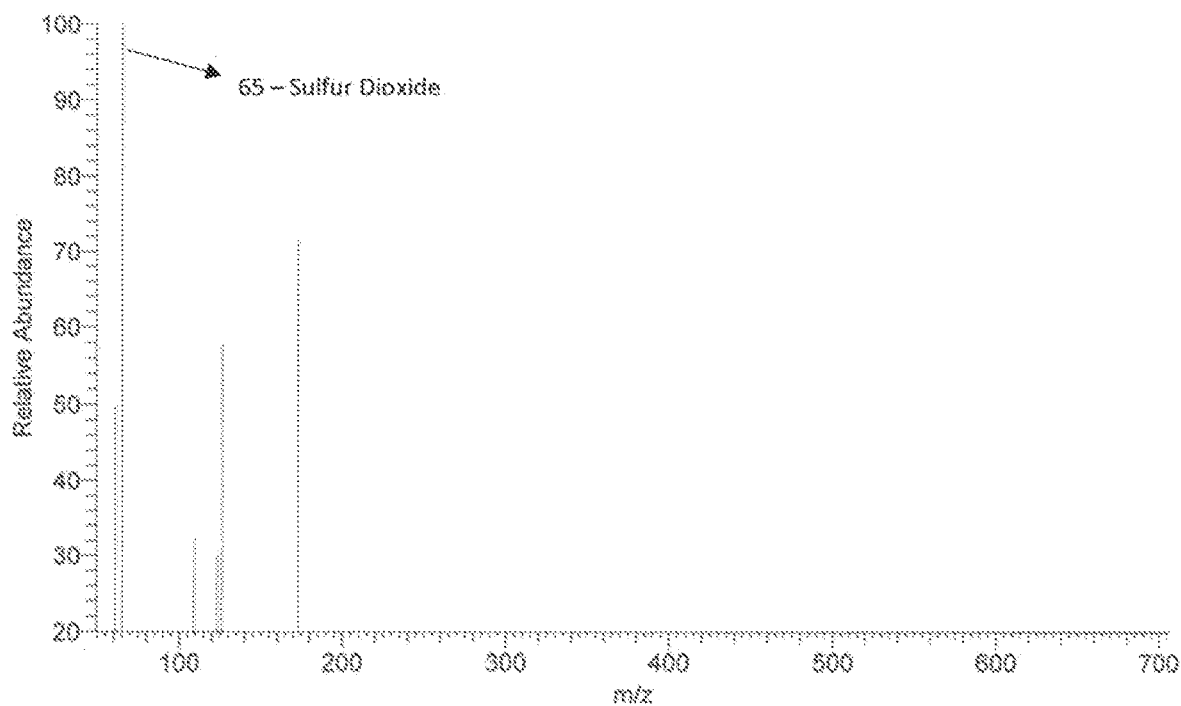
FIG. 5. depicts a low resolution spectrogram with 1 part reaction unit to 20 parts total.
Figure 6:
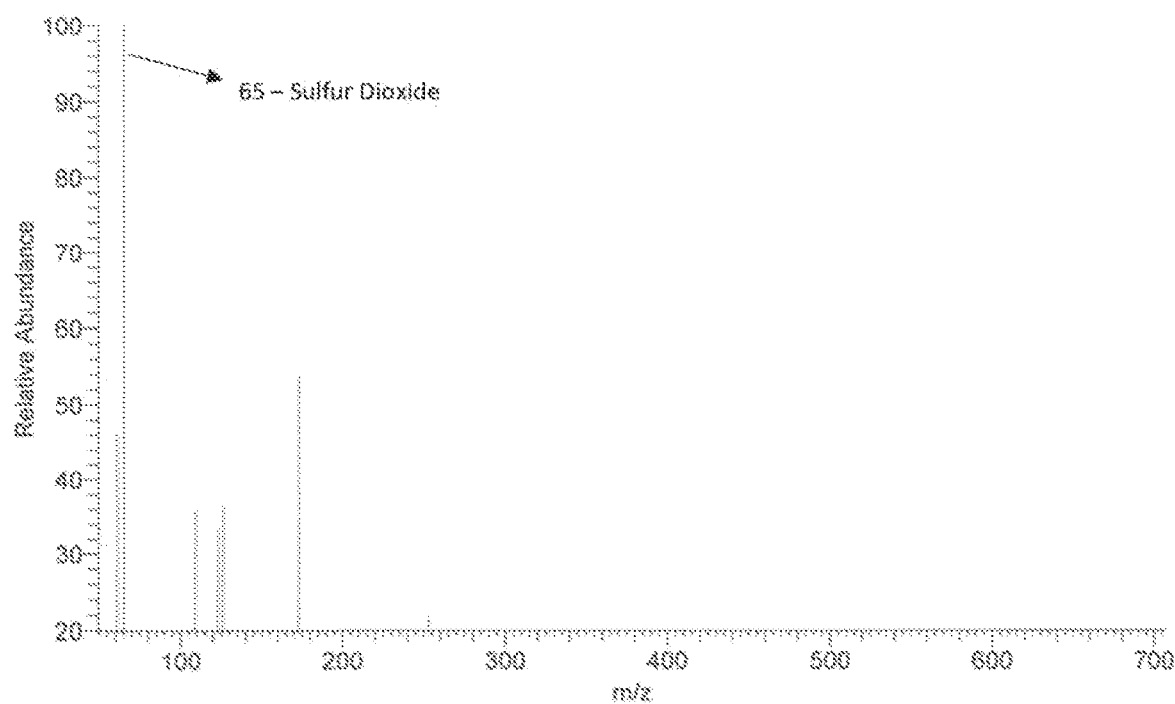
FIG. 6. depicts a high resolution spectrogram with 1 part reaction unit to 20 parts total.

Each of the spectrograms was run according to the respective teachings of Example 6. Each of the spectrograms depicts compositions that are free of salt crystals or other solids formed from the ammonium sulfate and sulfuric acid reactants.

While the aspects of the present disclosure are susceptible to various modifications and alternative forms, specific embodiments thereof are shown by way of example in the drawings and will herein be described in detail. It should be understood, however, that the drawings and detailed description are not intended to limit the disclosure to the particular forms illustrated but, on the contrary, the intention is to cover all modifications, equivalents and alternatives falling within the spirit and scope of the present disclosure as defined by the appended claims. The headings used herein are used for organizational purposes only and are not meant to limit the scope of the description. As used throughout this application, the word "may" is used in a permissive sense, meaning: "having the potential to"; rather than the mandatory sense meaning: "must". Similarly, the words "include", "including" and "includes" means including, without limitation. Additionally, as used in this specification and the appended claims, the singular forms "a", "an" and "the" include singular and plural referents unless the content clearly dictates otherwise.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combinations of features. In particular, with reference to the appended claims, features from dependent claims may be combined with those of independent claims and features from respective independent claims may be combined in any appropriate manner and not merely in the specific combinations enumerated in the appended claims.

DETAILED DESCRIPTION

Definitions

The term "antimicrobial" means antibacterial, anti-fungal, antiviral and anti-mold, each individually and collectively.

The term "alkali and alkaline metal carbonates" have their traditional meanings in the art.

The term "calcium carbonate" has its traditionally meaning and included, for example and without limitation, ground calcium carbonate, precipitated calcium carbonate and needle calcium carbonate, each being prepared in a variety of, for example and without limitation, purities, densities, fineness of grain, morphologies, surface areas, high oil absorption, bulk densities from ultra-low to super high powder densities, and the like.

The term "dilute sodium hydroxide" means sodium hydroxide, typically but not limited to solid form, diluted with water to a concentration of not greater than about 20 percent.

The term "first solution" means a solution of ammonium sulfate and sulfuric acid as further described herein and used in preparing a solubility enhancing aqueous composition.

The term "fill material" means at least one of calcium carbonate, China clay, talc, titanium dioxide and/or one or more other material that is typically added to a substrate for the formation of a final paper product which includes in part, calcium carbonate. The term "fill material", when used more generally in reference to the enhanced carbonate compositions of the present invention, has the traditional meaning as used in the art for the respective product in which the enhanced carbonate composition is used.

The term "free of solids" means that the solubility enhancing aqueous composition do not form salt crystals or other solids that remain in the composition over time, such salt crystals or other solids being formed from the reactants of ammonium sulfate and sulfuric acid.

The term "inhibition" or "inhibiting" means the act of prophylaxis, retarding and/or controlling the growth of microbes in products as described herein.

The term "microbes" means, individually or collectively, bacteria, fungi, viruses and/or mold.

The term "paper" means paper and paperboard (single or multi-ply), unless otherwise differentiated, as each term is known in the art.

The term "paper and paperboard products(s) means, without limitation, any product that contains or is made from paper and/or paperboard in part or in whole. One example of such products includes, without limitation, cardboard.

The term "pulp" or "paper pulp" (used interchangeably) means any raw material or combination of raw materials used for paper manufacture. Paper pulp or pulp can contain, for example and without limitation, vegetable, cellulosic, mineral and/or man-made fibers.

The term "reaction unit" relative to the preparation of a solubility enhancing aqueous composition means the desired total volume of a first solution as expressed as a ratio of a range of ammonium sulfate concentrations to sulfuric acid concentrations (the reactants).

The term "second solution" means the first solution as prepared for a final volume plus the requisite amount of water to form a composition of the present invention as further described herein and used in preparing a solubility enhancing aqueous composition.

The term "sodium hydroxide solution" means a sodium hydroxide, typically in a dilute sodium hydroxide solution, wherein the solution can be any dilution as further set forth herein.

The term "solubility enhancing aqueous composition" means the solubility enhancing aqueous compositions as described herein.

The term "sulfate anions" encompasses each of sulfate anions, bisulfate anions and combinations thereof. Combinations of sulfate anions and bisulfate anions are common in the solubility enhancing aqueous compositions described herein.

The term "sulfuric acid" means concentrated sulfuric acid having a concentration of from about 95% to about 98%.

The term "substantially free of solids" means that the solubility enhancing aqueous compositions and/or the enhanced carbonate compositions described herein are at least 95 percent aqueous or, alternatively, at least 98 percent aqueous without the formation of salt crystals or other solids. The addition of materials not an element of the solubility enhancing aqueous compositions and/or carbonate enhancing compositions in the preparation of compositions of the present invention may affect the amount of salts and/or other solids. As such, the term "substantially free of solids" pertains only to the preparations of each of the solubility enhancing aqueous compositions and/or the carbonate enhancing compositions of the present invention described herein.

DESCRIPTION

The following description and examples are included to demonstrate the embodiments of the present disclosure. It should be appreciated by those of skill in the art that the compositions, techniques and methods disclosed in the examples herein function in the practice of the disclosed embodiments. However, those skilled in the respective arts should, in light of the present disclosure, appreciate that changes can be made to the specific embodiments and still obtain a like or similar result without departing from the spirit and scope of the disclosed embodiments. The present specification includes references to "one aspect/embodiment" or "an aspect/embodiment". These phrases do not necessarily refer to the same embodiment although embodiments that include any combination of the features or elements disclosed herein are generally contemplated unless expressly disclaimed herein. Particular features, processes, elements or characteristics may be combined in any suitable manner consistent with this disclosure.

With the pulp-paper industry, at least two well-known problems exist with the use of calcium carbonate filler (e.g., precipitated, ground, needles and, without limitation, the like) incorporated into the paper web during paper formation on the papermaking wire, particularly increased use of such filler: i. filler particles added to fiber suspended in water are not easily retained in the forming sheet because they are often too small to be entrapped mechanically and because filler particles are negatively charged, they repel each other; and ii. filler particles can interfere with fiber-fiber bonding; therefore, causing tensile strength of the paper to suffer. Also, the addition of calcium carbonate beyond a certain level will cause, among other problems, reduced paper strength and stiffness, increased size demand, and increased abrasion and dusting.

Moreover, there are four primary means by which filler, particularly calcium carbonate, interacts with pulp fiber: i. calcium carbonate is distributed among the fibers; ii. one end of calcium carbonate is embedded in one fiber with the other end embedded in another fiber; iii. one end of calcium carbonate is embedded in one fiber with the other end being distributed among the fibers; and iv. calcium carbonate is entirely embedded in a fiber. The challenge is to provide for an environment for fiber-filler entanglement and friction while also providing for enhanced hydrogen bonding. The potential benefits can be an increase in filler loading, reducing fiber input and reducing paper costs, while maintaining the positive attributes typical of calcium carbonate used as a filler in paper, which are many and well known in the art.

Although filler particles (type and size) are frequently designed to accommodate individual paper customer needs, there exists a wide range of filler introduced during this aspect of the paper making process. For the sake of clarity, as used herein, the term "paper" also includes "paper board" products in addition to products made from such paper and paper board products. For example, and without limitation, calcium carbonate fill is generally about 10% to about 30%, typically about 20% for printing paper. The introduction of calcium carbonate can be added during the process at the wet-end or as a surface application. Filler level of up to about 50%, although not common, can be used for coated papers (e.g., wood-free 135 g/m2) and copy and office paper (75-80 g/m2 with up to 30% filler used; although 15% filler is reported to be used in North America for weight levels up to 75 g/m2). In essence, there are a plethora of variables known in the paper preparation art which are incorporated into a variety of processes, including numerous forms of filler, particularly calcium carbonate, used to form a broad range of paper, including paper board, products. It is not the intent of this disclosure to reteach paper making processes. Rather, it is the intent to recite a representative sample of some of the processes, and related variables, used in an intricate yet well-known art. As such, the use of calcium carbonate and, more specifically, carbonate enhanced compositions of the present disclosure, is not to be limited to the brief review of paper making processes disclosed herein. In fact, the carbonate enhanced compositions of the present invention can be used in lieu of straight calcium carbonate regardless of form, as used in wet-end processing.

Without being held to a particular theory, it is believed that the addition of at least one carbonate enhanced composition of the present invention compared to using straight calcium carbonate as a filler in pulp-based or other paper making processes modifies the zeta potential of the calcium carbonate, potentially providing stronger bonds/interaction between the fiber and calcium carbonate filler. The end result is a potentially higher percentage of calcium carbonate in the wet-end without the negative attributes associated with increased amounts of filler for each particular paper type. Such use of carbonate enhanced compositions of the present invention provides, without limitation, excellent runnability, overall potential cost savings, improved hydrophobic sizing, opacity, and print characteristics, and improved, or at least not a loss, of tensile, bond and/or burst strength, while potentially not affecting paper caliper or caliper pose compared to the use of non-enhanced calcium carbonate.

Accordingly, one aspect of the present invention provides a paper forming mixture comprising a paper making fiber and at least one carbonate enhanced composition of the present invention. Addition of such carbonate enhanced mixture is typically, without limitation, added to the paper making process at the wet-end.

Further provided is a paper forming mixture comprising a pulp-based mixture of pulp and at least one carbonate enhanced composition of the present invention.

Also provided is a paper forming mixture comprising a paper making fiber and at least one paper enhancing composition of the present invention. Addition of such paper enhancing composition is added, among other uses as set forth herein, to the paper making process at the wet-end.

Further provided is a paper forming mixture comprising a pulp-based mixture of pulp and at least one paper enhancing composition of the present invention.

An additional aspect of the present invention provides a paper forming mixture comprising a pulp-based mixture of pulp and at least one carbonate enhanced composition of the present invention, wherein the amount of calcium carbonate filler is at least five percent (5%) greater than the amount calcium carbonate fill typically added to a given paper type. For example, and without limitation, as reviewed in part above, for a paper type typically using 10-30% fill, the amount of fill that can be added to the paper forming wet mixture will equal at least 31.5% of the total wet mixture. This increase in calcium carbonate fill amount can be used for any paper type well known to the skilled artisan.

An further aspect of the present invention provides for a method of modifying the zeta potential of calcium carbonate used in a paper making process comprising the addition of at least one carbonate enhanced composition of the present invention to the wet-end of a paper making process. More particularly, the present invention also provides a method of modifying the zeta potential of calcium carbonate used in a pulp-based paper making process comprising the addition of at least one carbonate enhanced composition of the present invention to the wet-end of a paper making process.

The present invention further provides a method of increasing at least one of the group consisting of paper tensile, bond and burst strength of paper comprising the addition of at least one carbonate enhanced composition of the present invention to the wet-end of a paper making process compared to an equal amount of unenhanced calcium carbonate. As used herein, the term "unenhanced calcium carbonate" means straight calcium carbonate without the addition of at least one aqueous paper enhancing composition of the present invention.

A further aspect of the present invention provides a method of increasing at least one of the group consisting of paper tensile, bond and burst strength of paper comprising the addition of at least one carbonate enhanced composition of the present invention to the wet-end of a paper making process compared to an equal amount of unenhanced calcium carbonate without a decrease in at least one selected from the group consisting of runability, hydrophobic sizing, opacity and print characteristics.

An additional aspect of the present invention provides a method of increasing at least one of the group consisting of paper tensile strength, bond strength and burst strength of paper comprising the addition of at least one carbonate enhanced composition of the present invention to the wet-end of a paper making process compared to an equal amount of unenhanced calcium carbonate without an increase in caliper pose.

Further provided is a method of increasing the amount of calcium carbonate filler particles retained in a paper forming sheet to fiber suspended in water during the paper making process comprising the addition of at least one carbonate enhanced composition of the present invention to the wet-end of a paper making process compared to an equal amount of unenhanced calcium carbonate.

As taught herein, the addition of a carbonate enhanced composition of the present invention, through the modification of carbonate zeta potential and otherwise, has the potential to form more and tighter bonds among the fiber and fill than is otherwise typically the case when using only unenhanced calcium carbonate as a fill rather than at least one carbonate enhanced composition of the present invention. As such, the pores of the paper can be reduced with the use of the carbonate enhanced composition resulting in paper that is less penetrable to dust and other particulate matter, pollutants and microorganisms. Accordingly, another aspect of the present invention provides for a method of decreasing the pore size of paper comprising the addition of at least one carbonate enhanced composition of the present invention to the wet-end of a paper making process compared to an equal amount of unenhanced calcium carbonate. This phenomenon also provides for a method of preparing paper for medical and industrial protective uses comprising the addition of at least one carbonate enhanced composition of the present invention to the wet-end of a paper making process.

As further referenced herein, the carbonate enhanced compositions of the present invention also provide antimicrobial activity. Accordingly, an additional aspect of the present invention provides for antimicrobial paper, having a multitude of uses, comprising paper prepared by the addition of at least one carbonate enhanced composition of the present invention to the wet-end of a paper making process; such paper being useful for the inhibition of microbes.

A further aspect of the present invention provides a carbonate enhanced composition comprising silver carbonate and at least one aqueous carbonate enhancing composition. Also provided is a method of using at least one such carbonate enhanced composition in the preparations of at least one product using silver carbonate in its composition.

Further provided is a carbonate enhancing composition and a carbonate enhanced composition wherein at least silver sulfate is added to each such composition, either as the sole sulfate or in combination with copper sulfate. In essence, silver sulfate can be substituted for copper sulfate or used in combination with copper sulfate wherein the concentration of copper sulfate and/or silver sulfate in the present compositions as if copper sulfate alone is used. The same applies for the use of copper sulfate and/or silver sulfate in the paper enhancing compositions of the present invention.

An additional aspect of the present invention provides a carbonate enhanced composition comprising at least one organic compound carbonate and at least one aqueous carbonate enhancing composition. Also provided is a method of using a composition comprising at least one organic compound carbonate and at least one carbonate enhanced composition in the preparations of at least one product using at least one organic compound carbonate in its composition.

To prepare the carbonate enhanced compositions for use in the paper making process when calcium carbonate is used as at least one filler, at least 1.5 pounds of at least one carbonate enhancing composition of the present disclosure is added, typically as a spray designed to provide thorough coverage of the calcium carbonate particles, to each ton of one or more selected calcium carbonate products. Up to ten pounds or greater of carbonate enhancing composition per ton of calcium carbonate can be used to prepare a carbonate enhanced compositions for use in paper. More particularly, any whole or fractional number of the enumerated range of pounds of carbonate enhancing composition per ton of calcium carbonate is used to prepare a carbonate enhanced composition for use in paper. The use of the term "ton" as used herein refers to the U.S. ton. Slight adjustments of the amount of addition of a carbonate enhancing composition per ton of calcium carbonate may have to be made if tonnage is determined as metric tons or a British (long) ton. Any calcium carbonate product(s) used as filler for making paper can be used to prepare carbonate enhanced compositions of the present invention. Selection of the amount of carbonate enhancing composition added to calcium carbonate to prepare carbonate enhanced compositions for use in paper may be judicially selected by the manufacturer of either the calcium carbonate and/or the paper producer based on the type of paper (including paper board) and/or the use of the paper product(s). Furthermore, the use of carbonate enhanced compositions of the present invention should not be restricted by the use of other additives typically used in the paper manufacturing process.

To impart the antimicrobial properties in paper referenced herein, typically, at least 5 pounds of carbonate enhancing composition is used for each ton of calcium carbonate to form carbonate enhanced compositions although less may be adequate for certain paper uses. More particularly, the amount of calcium enhancing composition added to calcium carbonate for such antimicrobial uses in paper is, for example, 5 pounds, 6 pounds, 7 pounds, 8 pounds, 9 pounds, 10 pounds, 11 pounds and greater than 12 pounds, or any fractional number thereof, per ton of calcium carbonate.

For paper pulp, at least one carbonate enhanced composition, typically using calcium carbonate, can also be used as a causticizing agent in the pulp sulfate process, to prepare calcium bisulfate in the pulp sulfite process, used with chlorine in the bleaching process, in the treatment of pulp and paper mill waste treatment, a filtration conditioner, a neutralizing agent and to recover alcohol, calcium lignosulfonate and yeast.

The present invention further provides a paper enhancing composition comprising water, at least one solubility enhancing aqueous composition, sodium hydroxide, copper sulfate and, optionally, at least one surfactant selected from the group consisting of non-ionic surfactants and/or anionic surfactants.

An additional aspect of the present invention provides an aqueous or, substantially aqueous, paper enhancing composition (aqueous notwithstanding the potential for copper sulfate to not have completely dissolved in the paper enhancing composition) comprising an aqueous phase comprising a solubility enhancing aqueous composition wherein 1 part of a first solution is added to about 15 to about 20 parts of water, frequently deionized water, to form a second solution; sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition. The use of such surfactant in the present composition is optional. As used herein, the term "aqueous paper enhancing composition" also includes any such composition that is substantially aqueous as indicated above.

A further aspect of the present invention further comprises the addition of an acid or base to adjust the pH to a pH from about 2.5 to about 3.5 to the immediately preceding composition. There are multiple potential uses of such paper enhancing compositions throughout paper making and paper finishing processes. For example, paper enhancing compositions of the present invention can be added directly to the wet-end process of paper production for use as, for example, a paper coagulator and/or to provide microbial control.

As a coagulator, the addition of at least one paper enhancing composition to the wet-end of paper production can increase the tensile strength, bond strength and/or burst strength of paper through multiple actions. Without being held to a particular theory, it is believed that the addition of at least one paper enhancing composition of the present invention creates an environment wherein the fiber(s) used in paper making, with or without the presence of calcium carbonate as a fill material, enhances the attraction of the fibers, narrowing the interstitial spaces between and among fibers creating smaller pores while increasing the tensile, bond and/or burst strength of the resulting paper. The purpose for using such paper enhancing compositions in this context is to impart additional paper strength compared to paper produced without the use of such paper enhancing compositions without affecting paper caliper or pose or, alternatively, increased amount of such paper enhancing compositions can be used to increase the density of the resulting paper for a variety of uses including, for example and without limitation, preparation of paper, frequently in the form of masks, used for industrial and/or medical use wherein the passage of pollutions and/or microorganisms are retarded or prevented.

Accordingly, the present invention further provides a method of increasing at least one of paper tensile strength, bond strength and burst strength compared to paper prepared without the addition of at least one paper enhancing composition comprising the addition of at least one paper enhancing composition to the wet-end of the paper making process.

Another aspect of the present invention provides a method for decreasing the interstitial pore size between and among paper fibers in a wet-end paper making process compared to paper prepared without the addition of at least one paper enhancing composition comprising the addition of at least one paper enhancing composition to the wet-end of the paper making process.

An additional aspect of the present invention provides a method for increasing paper density compared to paper prepared without the addition of at least one paper enhancing composition comprising the addition of at least one paper enhancing composition to the wet-end of the paper making process.

A further aspect of the present invention provides for paper having antimicrobial properties comprising paper prepared using at least one paper enhancing composition during the wet-end process stage of paper making; such paper being useful for the inhibition of microbes.

It is believed that the addition of at least one paper enhancing composition of the present invention modifies the zeta potential of the calcium carbonate, when calcium carbonate is used as a filler material, modifying the charge of the calcium carbonate and potentially providing stronger bond/interaction between the fiber and calcium carbonate filler. Such modification of the zeta potential frequently provides an increase in the zeta potential although a decrease of zeta potential is possible depending upon the mixture to which at least one paper enhancing composition is added.

Accordingly, also provided herein is a method of modifying the zeta potential of calcium carbonate when used in the paper making process comprising applying at least one aqueous paper enhancing composition during the wet-end stage of paper production.

More particularly, the present invention also provides a method of modifying the zeta potential of calcium carbonate when used in a pulp-based paper making process comprising applying at least one aqueous paper enhancing composition during the wet-end stage of paper production.

To use the aqueous paper enhancing compositions and impart the benefits of the use thereof including, for example and without limitation, paper coagulation and antimicrobial activity, at least one aqueous paper enhancing compositions is added to the wet-end of a paper making process at a concentration of about at least 1,500 ppm of the total weight of the wet-end mixture to which the paper enhancing composition(s) is/are added. More specific amounts of paper enhancing compositions (aqueous or substantially aqueous) are added to the wet-end processes at concentrations of about 1,500 ppm, about 2,500 ppm, about 3,500 ppm, about 4,500 ppm, about 5,500 ppm, about 6,500 ppm or greater than about 7,000 ppm of the wet-end mixture to which the paper enhancing composition(s) is/are added. Moreover, any whole or fractional number of ppm of the stated range of paper enhancing composition may be added to the wet-end mixture to which the paper enhancing composition(s) is/are added. Selection of the amount of paper enhancing composition added to the wet-end mixture to which the paper enhancing composition(s) is/are added may be judicially selected by the paper producer based on the type of paper (including paper board) and/or the intended use of the paper product(s). Furthermore, the use of paper enhanced compositions of the present invention should not be restricted by the use of other additives typically used in the paper manufacturing process.

To impart the antimicrobial properties in paper referenced herein, typically, at least 2,500 ppm of the at least one paper enhancing composition is added or applied per ton of the wet-end mixture to which the paper enhancing composition(s) is/are added. More particularly, the amount of paper enhancing composition added or applied to the wet-end mixture to which the paper enhancing composition(s) is/are added for such antimicrobial uses in paper is, for example, about 2,500 ppm, about 3,500 ppm, about 4,500 ppm and greater than about 5,000 ppm, or any whole or fractional number thereof, per ton of wet-end mixture.

Notwithstanding the teachings for wet-end use of carbonate enhancing compositions and paper enhancing compositions of the present invention, a paper producer may not wish to enhance all of the paper produced from pulp or another fiber to the final product. It is beneficial for a paper producers to select which paper products may be treated to impart additional qualities to the final paper products. Such additional qualities can be imparted into or onto paper via the application of a paper enhancing composition of the present invention via application of such composition onto paper before, during or after the wet press aspect of paper production. Typically, after the wet-end step of paper production is completed, the mix of fiber, filler and any additional components is fed through a series of high pressure rollers for the purpose of squeezing out a substantial amount of water from the wet-end prior to the paper entering dryer and calendar sections. High pressure roller systems can be fitted with spray nozzles before, during or after the wet press section. It is throughout this wet press section of paper processing that one or more paper enhancing compositions of the present invention is/are sprayed onto the paper.

Application, typically as a spray, of at least one paper enhancing composition onto paper entering, during or following the wet press section of the paper making process can impart the same and additional benefits and attributes to paper as with the use of adding at least one carbonate enhanced composition and/or at least one paper enhancing composition of the present invention during the wet-end process as described herein. As such, application of at least one aqueous paper enhancing composition of the present invention can provide increased tensile, bond strength and/or burst strength to the respective paper, modify the zeta potential of calcium carbonate or at least one enhanced carbonate composition of the present invention used in the paper making process applied when the paper carries a substantial amount of water/moisture (e.g., the earlier to mid stages of the wet press process), improved hydrophobic sizing, opacity, and print characteristics, while potentially not affecting paper caliper or caliper pose unless otherwise intended. When desired, however, the density of paper can be increased by reducing pore spaces between and among the fiber and/or fill particles via the application of at least one aqueous paper enhancing composition of the present invention during the wet press stage of production. The resulting paper can be used for medical and industrial applications providing improved safety compared to products prepared without the benefit of the aqueous paper enhancing compositions. As further referenced herein, the aqueous paper enhancing compositions of the present invention also provide antimicrobial activity into and potentially throughout the paper onto which the present composition is applied during the wet press process of paper making. Collectively, the attributes presented in this paragraph represents, for the purposed herein, as "enhanced paper", and the process of preparing enhanced paper as "enhancing paper".

Accordingly, another aspect of the present invention provides for enhanced paper comprising paper having applied during the wet press stage of paper production at least one aqueous enhancing paper composition.

Further provided herein are the following methods:

A method of enhancing paper comprising applying at least one aqueous paper enhancing composition during the wet press stage of paper production.

A method of increasing at least one of the group consisting of tensile strength, bond strength and burst strength in paper compared to the respective tensile strength, bond strength and burst strength of paper untreated with an aqueous paper enhancing composition comprising applying at least one aqueous paper enhancing composition during the wet press stage of paper production.

A method of modifying the zeta potential of calcium carbonate when used in the paper making process comprising applying at least one aqueous paper enhancing composition during the wet press stage of paper production.

The present invention also provides a method of modifying the zeta potential of calcium carbonate used in a pulp-based paper making process comprising applying at least one aqueous paper enhancing composition during the wet press stage of paper production.

A method of increasing at least one of the group consisting of paper tensile strength, bond strength and burst strength of paper comprising applying at least one aqueous paper enhancing composition during the wet press stage of paper production compared to paper untreated with an aqueous paper enhancing composition without an increase in caliper pose.

A method of decreasing the pore size of paper comprising applying at least one aqueous paper enhancing composition during the wet press stage of paper production compared to paper untreated with an aqueous paper enhancing composition. This method typically requires the use of such compositions at concentrations in the higher end of the stated ranges.

A method of preparing paper for medical and industrial protective uses comprising applying at least one aqueous paper enhancing composition during the wet press stage of paper production.

A method of preparing paper for use in masks for mammalian, particularly human, use comprising applying at least one aqueous paper enhancing composition during the wet press stage of paper production.

Further provided is antimicrobial paper, having a multitude of uses, comprising paper prepared by the application of at least one aqueous paper enhancing composition of the present invention during the wet press stage of paper production.

To use the aqueous paper enhancing compositions and impart the benefits of the use thereof including, for example and without limitation, paper strengthening and antimicrobial activity, at least one aqueous paper enhancing compositions is applied, typically as a spray, before, during or after the wet press stage of a paper making at a concentration of about at least 1,500 ppm of such composition to each ton of wet weight matter entering the wet press stage. More specifically, amounts of paper enhancing compositions are applied as a spray during the wet press stage of paper making at concentrations of about 1,500 ppm, about 2,500 ppm, about 3,500 ppm, about 4,500 ppm, about 5,500 ppm, about 6,500 ppm or greater than about 7,000 ppm to each ton of wet weight matter entering the wet press stage of paper making. Generally, concentrations of paper enhancing compositions can be reduced at later stages of the wet press stage if the spray containing paper enhancing compositions is applied after a substantial amount of moisture is removed. However, if the spray containing paper enhancing compositions of the present invention is applied once the paper is substantially dry but prior to entering the drying process, it is suggested to use the spray concentrations set forth below for paper coatings. However, slightly higher concentrations should be used based on the amount of residual moisture prior to such drying stage. Moreover, any whole or fractional number of ppm, within the stated concentration range, of paper enhancing composition may be applied during the wet press stage. Selection of the amount of paper enhancing composition applied during the wet press stage may be judicially selected by the paper producer based on the type of paper (including paper board) and/or the use of the paper product(s). Furthermore, the use of paper enhanced compositions of the present invention should not be restricted by the use of other additives typically used in the paper manufacturing process.

To impart the antimicrobial properties in paper referenced herein, typically, at least 2,500 ppm of the at least one paper enhancing composition is applied for each ton of wet weight matter entering the wet press stage. More particularly, the amount of paper enhancing composition applied during the wet press stage for such antimicrobial uses in paper is, for example, about 2,500 ppm, about 3,500 ppm, about 4,500 ppm and greater than about 5,000 ppm, or any whole or fractional number thereof, per ton of wet weight matter entering the wet press stage of paper production. The amount of paper enhancing composition used can be adjusted pursuant to the recommendations set forth in the immediately preceding paragraph.

Alternatively, at least one of the aqueous paper enhancing compositions of the present invention can be applied to paper as an additive to surface sizing, wherever surface sizing is applied throughout the paper and or paper printing processes. The concentrations of at least one paper enhancing composition of the present invention when applied with sizing are the same concentrations taught herein below for the concentrations used for paper coatings. The only difference is that the concentrations are based on the total volume of sizing being surface applied to paper rather than the total volume of paper coating(s) being applied. As such, a minimum recommended concentration of at least one paper enhancing composition of the present invention to be applied with surface sizing is at least about 1,500 ppm of the total sizing volume being surface applied for general use and benefit; and at least about 2,500 ppm of such paper enhancing composition when antimicrobial activity is desired.

For each use of an aqueous paper enhancing compositions of the present invention, application during the paper making process as described above or when used as paper coatings as described below, such compositions can be applied individually or in combination with other additives and/or coating material as such materials are used in the paper making/processing arts.

Applications of at least one aqueous paper enhancing composition of the present invention can also be applied directly to finished paper at any time following the dryer section of the paper making process. In other words, such application can be made from the calender section of paper making through and following printing thorough a printing press or other printing method; or, alternatively, to prepare paper products or directly to final paper products.

In addition to coatings being applied by the paper manufacturer, liquid coatings are frequently applied in-line by the printer as part of the printing process or off-line after the project leaves the press. Although the paper enhancing compositions of the present invention can be applied with any liquid coating, the present paper enhancing compositions are typically applied with commonly used or specialty aqueous coatings that are usually flooded across the entire sheet. Different coatings are available in different finishes, tints, textures and thicknesses, which may be used to adjust the level of protection or achieve different visual effects. Areas that are heavily covered with black ink or other dark colors often receive a protective coating to guard against fingerprints, which stand out against a dark background. Coatings are also used on magazine and report covers and on other publications that are subject to rough or frequent handling. Moreover, communicable diseases caused by microorganisms, particularly, without limitation bacteria, including MRSA, and viruses such as noroviruses and coronaviruses, each of which, along with other pathogens, have the ability to remain viable and transmissible on surfaces, including paper, for a period of time. Accordingly, it is beneficial to have additional materials that can be added to liquid paper coatings to impart attributes such as additional tensile strength, bond strength and/or burst strength to coated paper. Additionally, it is beneficial to provide antimicrobial attributes to the surface of paper through coatings. Each of these attributes can be added to paper via the application of at least one paper enhancing composition of the present invention as a component in other liquid, commonly aqueous, paper coatings or at a particular concentration to other acceptable paper coating media, including water. Coatings including at least one paper enhancing composition of the present invention can be applied via any method used in the paper coating industry including, for example and without limitation, flood coating, blade coating, premetered film presses and roll metering. Each type of coating has particular uses, benefits and drawbacks. As such, the applier of such coatings can select the best coating and type of application for each such coating application. Accordingly, the application of at least one paper enhancing composition of the present invention should not be limited by the type of paper coating or method of application.

As such, another aspect of the present invention provides for a paper coating comprising at least one aqueous paper enhancing composition.

An additional aspect provides for paper coated with at least one aqueous paper enhancing composition.

Another aspect of the present invention provides a method of increasing at least one of the group consisting of paper tensile strength, bond strength and burst strength of paper comprising the application of a coating to paper comprising at least one paper enhancing composition of the present invention.

Paper, including the printing on paper, can also be enhanced and protected by a variety of well-known liquid additives. The present aqueous paper enhancing compositions of the present invention, when applied as paper coatings alone or in combination with other paper coating materials including, for example and without limitation, varnish and ultra violet coatings, can also provide, for example and without limitation: protection from fingerprints and other blemishes, help prevent metallic inks from tarnishing, and provide surfaces that can be written on with pencil, pen, ink jet printers, laser jet printers, off-set printers and the like. Although the present aqueous paper enhancing compositions can be applied to paper, in general, it may be best to use 80# text weight or heavier paper stocks to keep the paper from becoming curled or wrinkled, particularly when using a flood coating method.

An additional aspect of the present invention provides for a method of providing at least one of protection from fingerprints and other blemishes, help prevent metallic inks from tarnishing, and provide paper surfaces that can be written on with multiple media (including, without limitation, pencil, pen, ink jet printers, laser jet printers, off-set printers and the like) comprising the application of a coating to paper comprising at least one paper enhancing composition of the present invention.

A further aspect of the present invention provides for a method of providing improvement of at least one of protection from fingerprints and other blemishes, help prevent metallic inks from tarnishing, and provide paper surfaces that can be written on with multiple media (including, without limitation, pencil, pen, ink jet printers, laser jet printers, off-set printers and the like) compared to paper coatings not including the application of at least one aqueous paper enhancing composition of the present invention comprising the application of a coating to paper comprising at least one paper enhancing composition of the present invention.

Because of the antimicrobial activity of the present paper enhancing compositions of the present invention, such compositions can be used as coatings to paper to provide such antimicrobial activity. Paper coated with such compositions have almost unlimited uses including, for example and without limitation, construction of masks used for industrial pollutants and/or medical masks used by any individuals including medical and first-responder personnel, paper used for wrapping food products including produce and/or fish and/or meat products, paper used as or in diapers, papers used as diapers, in produce and/or fish and/or meat products (for example, the absorbent paper underlining packaged poultry products), packaging, generally, blotters used by children and/or adults, facial tissues, sanitary napkins, liners for fruit, or any of a plethora of other paper uses where the inhibition of microorganism is desired and/or required.

Accordingly, another aspect of the present invention provides for coated paper having antimicrobial activity comprising paper coated with at least one aqueous paper enhancing composition of the present invention.

An additional aspect of the present invention provides for paper having antimicrobial properties comprising paper coated with at least one aqueous paper enhancing composition of the present invention.

Another aspect of the present invention provides for a method of preparing paper having antimicrobial activity comprising applying as a coating to paper at least one aqueous paper enhancing composition of the present invention to said paper.

Further provided is antimicrobial paper, having a multitude of uses, comprising paper prepared by the application of a coating of at least one aqueous paper enhancing composition of the present invention during the wet press stage of paper production.

Because of the antimicrobial activity of paper coated with at least one such aqueous paper enhancing composition, such coated paper can protect and potentially prolong the shelf-life of produce, meats and other perishable foodstuff (collectively, "foodstuff"). As such, another aspect of the present invention provides a method of extending the shelf-life of perishable foodstuff comprising placing such foodstuff in contact, in whole or in part, with paper coated with at least one aqueous paper enhancing composition of the present invention. Such shelf-life can be extended for at least 24 hours, providing substantial value to providers of such perishable foodstuff.

Another aspect provides a method for preparing paper for medical and industrial protective uses comprising applying as a coating to paper at least one aqueous paper enhancing composition during.

An additional aspect provides a method of preparing paper for use in masks for mammalian, particularly human, use comprising applying as a coating at least one aqueous paper enhancing composition.

Aqueous paper enhancing compositions of the present invention are applied to paper as coatings, either as a single coating in a liquid-based solution, frequently water, or as at least one component with other surface-applied paper coating materials at a concentration of at least about 1,500 ppm of the total amount of liquid-based solution or coating being applied. More specifically, amounts of paper enhancing compositions are applied as a spray coating at concentrations of about 1,500 ppm, about 2,500 ppm, about 3,500 ppm, about 4,500 ppm, about 5,500 ppm, about 6,500 ppm or greater than about 7,000 ppm of the total amount of liquid-based solution or coating being applied. Moreover, any whole or fractional number of ppm of paper enhancing composition, within the given concentration range, may be applied during the coating process. Selection of the amount of paper enhancing composition applied during the coating process stage may be judicially selected by the paper producer, printer, or desire of the end user based on the type of paper (including paper board) and/or the use of the paper product(s).

To impart the antimicrobial properties in paper referenced herein, typically, aqueous paper enhancing compositions of the present invention are applied to paper as coatings, either as a single coating in a liquid-based solution, frequently water, or as at least one component with other surface-applied paper coating materials at a concentration of at least about 2,500 ppm of the total amount of liquid-based solution or coating being applied. More specifically, to provide antimicrobial properties to paper coatings, amounts of paper enhancing compositions are applied as a spray coating at concentrations of about 2,500 ppm, about 3,500 ppm, about 4,500 ppm, about 5,500 ppm, about 6,500 ppm or greater than about 7,000 ppm of the total amount of liquid-based solution or coating being applied to the paper. Moreover, any whole or fractional number of ppm of paper enhancing composition within the given concentration range, may be applied during the coating process. Selection of the amount of paper enhancing composition applied during the coating process stage may be judicially selected by the paper producer, printer, or desire of the end user based on the type of paper (including paper board) and/or the use of the paper product(s).

For each of the claims set forth herein below, such claims can be alternatively drafted using "consisting of" and "consisting essentially of" claim language.

One element of the present paper enhancing compositions and carbonate enhancing compositions of the present invention provides a solubility enhancing aqueous composition comprising a first solution comprising an anionic component consisting essentially of sulfate ions, alone or in combination with bisulfate ions, having a concentration from about 8.00 moles per liter to about 13.00 moles per liter of the first solution volume, and a cationic component consisting essentially of ammonium ions having a concentration from about 1.45 moles per liter to about 2.01 moles per liter of the first solution volume, combined with a volume of water at least equal to the volume of the first solution forming a second solution. Generally, the first solution of this composition will also comprise hydrogen ions in a concentration from about 17.38 to about 21.68 moles per liter of the total volume of the first solution.

An alternative element of the present paper enhancing composition provides a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a volume of water at least equal to the volume of the first solution forming a second solution. Generally, the first solution of this composition will also comprise hydrogen ions in a concentration from about 17.38 to about 21.68 moles per liter of the total volume of the first solution.

It is the intent of the present disclosure to permit the skilled artisan to prepare a solubility enhancing aqueous composition element using a range of water in a ratio to the concentrations of ammonium sulfate and sulfuric acid for each preparation, with the resultant sulfate anions and ammonium cations, and the amount of water to be determined by such artisan, each within the parameters taught herein.

For the sake of clarity, three solutions are formed in preparing the second solution which comprise solubility enhancing aqueous compositions: 1) ammonium sulfate stock solution; 2) a first solution comprising the ammonium sulfate stock solution in sulfuric acid; and 3) second solution comprising solubility enhancing aqueous compositions. Unless context otherwise dictates, general references to the use of a first solution and a second solution refers to the preparation of the referenced solubility enhancing aqueous compositions used in the preparation of paper enhancing agent compositions of the present invention.

To prepare the first solution of a composition of the present disclosure, one needs to first prepare an ammonium sulfate stock solution. For example and without limitation, an ammonium sulfate stock solution is prepared to contain 20%, 24%, 30%, 40%, 50% or 60% of ammonium sulfate in water, typically, without restriction, deionized water. For the sake of clarity, the percent concentration of ammonium sulfate can be any whole number or fraction thereof in a range from about 20% to about 60%. The molar concentration of the stock solution varies by the ammonium sulfate concentration in a known volume of water.

By means of exemplification, the following calculations are used to determine the amount of ammonium sulfate and sulfuric acid to add to form a first solution.

Ammonium Sulfate:
Ammonium sulfate equals 132.14 grams per mole. Using, for example, a 24% ammonium sulfate solution, such solution would have 240 grams of ammonium sulfate per 1 L of water. Because the ratio of ammonium sulfate to sulfuric acid in this exemplification is about 48% ammonium sulfate to about 52% sulfuric acid, the first solution would contain 115.20 grams of ammonium sulfate, equaling 0.872 moles per liter. As such, one mole of ammonium sulfate provides 2 moles of ammonium and 1 mole of sulfate. Accordingly, 0.872 moles of ammonium sulfate provides to the ammonium sulfate stock solution 1.744 moles of ammonium and 0.872 moles of sulfate required per liter of reaction in forming the first solution.

Sulfuric Acid (Concentrated):
Sulfuric acid equals 98.079 g/mole as concentrated (95% to 98%) reagent grade sulfuric acid. Sulfuric acid exists as a liquid and has a density of 1.840 g/mL. For this example, sulfuric acid comprises 52% of a first solution of 1 liter. As such, 520 mL (0.52 L) of sulfuric acid is added to the ammonium sulfate stock solution. 520 mL times 1.840 g/mL equals 956.8 grams. 956.8 grams divided by 98.079 grams per mole provides the target concentration of 9.755 moles of sulfuric acid per liter of preparation. 9.755 moles of sulfuric acid provides 9.755 moles of sulfate anion and 2 moles of hydrogen resulting from each mole of acid, in this example, 19.51 moles of hydrogen per liter of said first solution.

Reaction Unit:
Using the values set forth above, in this instance, there are about 0.872 moles of ammonium sulfate to about 9.755 moles of sulfuric acid providing:

about 0.872 moles of ammonium sulfate provides about 0.872 moles of sulfate and about 1.744 moles of ammonium required per reaction unit liter; and about 9.755 moles per liter of sulfuric acid provides about 9.755 moles of sulfate anion and about 19.51 moles of hydrogen per liter of reaction unit.

Using this example, each reaction unit, forming a first solution, would contain:

about 0.972 moles of sulfate (from ammonium sulfate) plus about 9.755 moles of sulfate from ammonium sulfate equaling about 10.627 moles of sulfate anion per liter comprising sulfate anions alone, bisulfate anions alone or, typically, a mixture of sulfate and bisulfate anions;

about 1.744 moles of ammonium per liter; and about 19.51 moles of hydrogen per liter.

To accomplish the formation of a solubility enhancing aqueous composition, a second solution is formed by the addition of water, a critical component, in an appropriate amount, to provide solubility enhancing aqueous compositions that are substantially free, or free, of solids. Alternatively, a first solution can be added to the appropriate amount of water to form a second solution. As such, the order of addition of a first solution to water or water to the first solution to form a second solution is not of consequence. Use of the solubility enhancing aqueous compositions may form solids when combined with other chemical or other materials when using such solubility enhancing aqueous compositions for its intended purpose: enhancing solubility of such chemical compounds or other materials.

Generally, water is at least fifty percent of the second solution that represents the solubility enhancing aqueous compositions. Moreover, water can comprise from at least fifty percent up to ninety-nine percent of the second solution or final composition. However, the lower concentrations of water, as taught herein, are typically more useful for further use of the present compositions used for solubility enhancement. Accordingly, the amount of water used to form a second solution is at least 50% of the volume of the first solution or at least 50% of the mass of the first solution. Alternatively, the mass of the sum of the ammonium ion concentration plus sulfate ion concentration in a first solution can also serve as the basis of the amount of water to be added to form a second solution wherein the amount of water added, by mass, to form a second solution equals at least 50% of the sum of the mass of ammonium ions plus sulfate ions. Another means by which to represent the amount of water added to the first solution is that the amount of water used to form a second solution is at least equal to the volume of the first solution or at least equal to the mass of the first solution. Alternatively, the mass of the sum of the ammonium ions plus sulfate ions in a first solution can also serve as the basis of the amount of water to be added to form a second solution wherein the amount of total water, including the water used to solubilize the ammonium sulfate and added water, is at least equal to the sum of the mass of ammonium ions plus sulfate ions.

The amount of water used to prepare the second solution, representing solubility enhancing aqueous compositions, can be calculated in volume/volume (total volume of the first solution plus at least the same volume of water). Alternatively, the ratio of reactants to water (mass/mass) may be used. Using the values for ammonium sulfate and sulfuric acid from the above example, 115.20 grams of ammonium sulfate and 956.8 grams of sulfuric acid were used providing a sum of 1072 grams of reactants. Accordingly, for water to equal at least fifty percent of the final composition, at least 1072 grams of water are added to the first solution to form the second solution, a solubility enhancing aqueous composition. Alternatively, as referenced above, the amount of water used to form a second solution can be based on the total mass or volume of the first solution. Accordingly, any method taught herein can be used for calculating the amount of water required to form a second solution. As taught above, using the mass of the reactants to dictate the amount of water required to form a second solution is the minimum amount of water required to provide an aqueous solution and to impart the qualities of the compositions of the present invention as further delineated herein.

To achieve solubility enhancement, ranges of concentration of sulfate ions and ammonium ions in the solubility enhancing aqueous compositions are used while maintaining solubility enhancing aqueous compositions that are essentially free or are free of salt crystals or other solids from the reactants that form a first solution. Accordingly, a first solution comprises an anionic component consisting essentially of sulfate ions, alone or in combination with bisulfate ions, has a concentration range from about 8.00 moles per liter to about 13.00 moles per liter of the first solution volume. The first solution also comprises a cationic component consisting essentially of ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume.

In another embodiment of the solubility enhancing aqueous compositions, a first solution comprises an anionic component comprising sulfate ions, alone or in combination with bisulfate ions, has a concentration range from about 8.00 moles per liter to about 13.00 moles per liter of the first solution volume. The first solution also comprises a cationic component comprising ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume. When prepared according to the solubility enhancing aqueous composition embodiments provided herein, the resulting hydrogen ion concentration will typically fall within the range from about 17.38 moles per liter to about 21.68 moles per liter of first solution volume but falling within this hydrogen range is not necessarily critical to the final first solution but is beneficial when using the solubility enhancing aqueous compositions for enhancing solubility of compounds or other materials depending upon the nature thereof.

The process for preparing the solubility enhancing aqueous compositions can be carried out using traditional laboratory and safety equipment when using concentrated acid and water that could generate significant heat. Within these considerations, the selection of laboratory equipment is not critical to the formation of the solubility enhancing aqueous solutions or compositions. More particularly, the preparation of the first solution wherein the reactants ammonium sulfate stock solution is combined with sulfuric acid requires laboratory apparatuses that are approved for heat generation, splashing and, potentially, pressure relief. Accordingly, the first solution should be prepared in a laboratory vessel that is not sealed providing for pressure relief, rather than a potential hazardous situation with pressure build up in an unrated vessel. The ordinarily skilled artisan should be knowledgeable in the selection and use of such apparatuses.

For commercial-scale production of solubility enhancing aqueous compositions, the ordinarily skilled artisan will recognize that the reaction between the solubilized ammonium sulfate and sulfuric acid is typically exothermic. As such, a reaction vessel appropriate to safely contain and, typically, cool this reaction, is recommended. Commercial production of a first solution and a second solution can be accomplished using any of the teachings herein but on a larger scale than the laboratory scale teachings and examples disclosed herein. Moreover, such commercial production can be accomplished, without limitation, as taught herein or with equipment known to the ordinarily skilled artisan.

The order of adding the reactants to each other is not critical in the preparation of a first solution. Either the stock ammonium sulfate solution can be added to the sulfuric or, more typically, sulfuric acid is added to the stock ammonium sulfate stock solution to avoid the splattering typical of adding a solution containing water to acid. Typically, the heat generating reaction forming the first solution is permitted to run to conclusion, with the term "conclusion" having the meaning understood by the ordinarily skilled artisan, prior to adding the first solution to the required water or water to the first solution, without preference to the order of addition. For the sake of clarity, conclusion of the reaction between the ammonium sulfate stock solution and sulfuric acid typically occurs when the reactants no longer produce an exothermic reaction and the temperature of the solution begins to decrease to ambient temperature.

Alternatively, the formation of a first solution is not required and the ammonium sulfate stock solution and sulfuric acid can be combined with the final desired volume of a solubility enhancing aqueous compositions. Accordingly, another aspect of the solubility enhancing aqueous compositions provides a solubility enhancing aqueous composition comprising an anionic component consisting essentially of sulfate anions having a concentration from about 8.00 moles per liter to about 13.00 moles per liter of about one-quarter of the final solubility enhancing aqueous composition volume and a cationic component consisting essentially of ammonium ions having a concentration from about 1.45 moles per liter to about 2.01 moles per liter of about one-quarter of the final solubility enhancing aqueous composition volume or less, and water comprising at least one-half of the final composition volume.

An alternate solubility enhancing aqueous composition comprises an anionic component comprising sulfate anions having a concentration from about 8.00 moles per liter to about 13.00 moles per liter about one-half of the final solubility enhancing aqueous compositions volume and a cationic component comprising ammonium ions having a concentration from about 1.45 moles per liter to about 2.01 moles per liter of about one half of the final solubility enhancing aqueous composition volume.

Another alternate solubility enhancing aqueous composition comprises an anionic component consisting essentially of sulfate anions having a concentration from about 8.00 moles per liter to about 13.00 moles per liter and a cationic component consisting essentially of ammonium ions having a concentration from about 1.45 moles per liter to about 2.01 moles per liter of the final solubility enhancing aqueous composition volume wherein said liter volume for calculation for the volume of water comprising the ammonium ions and sulfate anions comprises at least one percent of the total volume of the solubility enhancing aqueous composition.

A further alternate solubility enhancing aqueous composition comprises an anionic component consisting essentially of sulfate anions having a concentration from about 8.00 moles per liter to about 13.00 moles per liter of not more than about one-half of the final solubility enhancing aqueous composition volume and a cationic component consisting essentially of ammonium ions having a concentration from about 1.45 moles per liter to about 2.01 moles per liter of not more than about one-half the final solubility enhancing aqueous composition volume.

An additional alternate solubility enhancing aqueous composition comprises an anionic component comprising sulfate anions having a concentration from about 8.00 moles per liter to about 13.00 moles per liter of not more than about one-half of the final solubility enhancing aqueous composition volume and a cationic component comprising ammonium ions having a concentration from about 1.45 moles per liter to about 2.01 moles per liter of not more than about one-half the final solubility enhancing aqueous composition volume.

Although certain aspects of the solubility enhancing aqueous compositions allow for highly dilute concentrations for the ammonium cations and sulfate anions, specific concentrations of these ions can be calculated on a basis as if such combination were prepared on a per liter basis wherein the volume of such preparation comprises 1%, 10%, 20%, 30%, 40%, 48%, 50% or 60% of the total volume of the final solubility enhancing aqueous composition. For the sake of clarity, the volume of water can be any whole number or fraction thereof in a range from about 1% to about 60%. In addition, the volume of total water in each of the solubility enhancing aqueous compositions taught herein can be calculated by a variety of methods as taught herein and are not limited by any one teaching. As such, the amount of water used to form a second solution can be based on weight/weight (first solution weight to the weight of water added to form a second solution); mass/mass (first solution mass to the mass of water added to form a second solution; and mass/mass (the mass of the sum of ammonium ions and sulfate ions to the mass of total water in the second solution). Each of these methods can be used in a two-step process wherein a first solution is formed and water is added to form a second solution, or a one-step process where the elements of a second solution of the present invention are pre-calculated and added accordingly.

As referenced above, one aspect of the present invention provides an aqueous paper enhancing composition comprising an aqueous phase comprising: a solubility enhancing aqueous composition wherein 1 part of a first solution is added to about 15 to about 20 parts of water to form a second solution; sodium hydroxide solution having a concentration of about 5% to about 7.5% volume/volume of the total aqueous phase volume of the composition; at least one optional surfactant selected from the group consisting of non-ionic surfactant and anionic surfactant having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition. A further aspect of the present invention further comprises the addition of an acid or base to adjust the pH to a pH from about 2.5 to about 3.5 to the immediately preceding composition.

A further aspect of the present invention further comprises the addition of an acid or base to adjust the pH to a pH from about 2.5 to about 3.5 to the immediately preceding composition.

For the preparation of the above-referenced aqueous paper enhancing composition, a 20 percent to 50 percent dilute sodium hydroxide solution is prepared using techniques well known to the skilled artisan. The range of sodium hydroxide concentration in the present aqueous paper enhancing compositions is based on varied concentrations of sodium hydroxide. When higher concentration sodium hydroxide solutions are used, one would typically use the lower concentration range of about 0.5% volume/volume of the total aqueous element volume of the composition. Conversely, when lower concentration sodium hydroxide solutions are used, one would typically use the higher concentration range of about 0.75% volume/volume of the total aqueous element volume of the composition. Total aqueous element volume composition means the sum volume of the aqueous components of the present composition including the solubility enhancing aqueous composition, sodium hydroxide solution and surfactant.

Various aqueous concentrations of non-ionic and anionic surfactants are commercially available, frequently found in concentrations of about 20% to about 80% in water. Such surfactants can also be prepared by diluting concentrated non-ionic surfactant and/or anionic surfactants in water to desired concentrations. Accordingly, such surfactants having a concentration of 20%, 30%, 40%, 50%, 60%, 70% and 80% are useful in the present composition. Generally, surfactant concentrations of at least 20% in water are useful. More particularly, a 50% concentration of Glucopon® 420 in water (available from multiple vendors including, for example, BASF Corp., Florham Park, New Jersey, USA) is useful as a nonionic surfactant in the present aqueous paper enhancing compositions. When higher concentration surfactant solutions are used, one would typically use the lower concentration range of about 0.05% volume/volume of the total aqueous element volume of the composition. Conversely, when lower concentration surfactant solutions are used, one would typically use the higher concentration range of about 0.15% volume/volume of the total aqueous element volume of the composition.

Additionally, a solubility enhancing aqueous composition is prepared wherein 1 part of a first solution, as described above, is added to about 15 to about 20 parts of water to form a second solution.

For preparation of the aqueous paper enhancing composition of the present invention, to the solubility enhancing aqueous composition is added dilute sodium hydroxide (about 20% to about 50%) having a concentration of about 5% to about 7.5% volume/volume of the total aqueous element volume of the composition. The surfactant element of the present composition can be added to this aqueous solution or can optionally be added following the addition of the copper sulfate element. However, the calculation for the concentration of the surfactant is based on the total aqueous element volume of the composition as if the copper sulfate had not yet been added. The at least one surfactant is selected from the group consisting of non-ionic surfactant and anionic surfactant having a concentration from about 0.05 percent to about 0.15 percent volume/volume of the total aqueous element volume of the composition.

The copper sulfate element of the present aqueous paper enhancing composition is added to the aqueous solution described above at a concentration from about 20 percent to about 26% mass/volume of the total aqueous element volume of the composition.

Once the present composition is prepared, the final pH should be adjusted to a pH of from about 2.5 to about 3.5 with a pH of about 3.0 being typically used. Any base or acid can be used to increase or decrease, respectively, the pH of such a composition. However, it is best to utilize acids and bases already used in the present compositions; dilute sodium hydroxide to increase the pH and sulfuric acid to decrease the pH. Alternatively, pH is controlled throughout the various steps of preparation of an aqueous paper enhancing composition of the present invention. For example, pH can be adjusted to the ranges set forth above following the addition of dilute sodium hydroxide to the previously prepared solubility enhancing aqueous composition, and then again following the addition of copper sulfate and, optionally, following the addition of copper sulfate and the anionic and/or nonionic surfactant. As such, the pH is adjusted at least one time during preparation of an aqueous paper enhancing composition, typically following the addition of the copper sulfate and/or surfactant.

The process for preparing the carbonate enhancing compositions, including aqueous carbonate enhancing compositions, can be carried out using traditional laboratory and safety equipment when using concentrated acid and water that could generate significant heat. Within these considerations, the selection of laboratory equipment is not critical to the formation of the carbonate enhancing compositions and/or aqueous carbonate enhancing compositions. The ordinarily skilled artisan should be knowledgeable in the selection and use of such apparatuses.

For larger scale production batches of such carbonate enhancing compositions of the present invention, including aqueous paper enhancing compositions, such compositions are prepared based on the percentages taught herein above of the elements required for preparation of such compositions.

As a non-limiting example, such compositions can be prepared as follows: to produce 330 gallons of finished product, to an adequate-sized tank having circulation mixing, is about 2,116 pounds of 17 megohm water, typically, distilled water, about 183 pounds of a solubility enhancing aqueous composition, with continued mixing, about 183 pounds of 50% sodium hydroxide that is slowly added to the prior mixture, with continued mixing, about 590 pounds copper sulfate, with continued mixing to maintain the copper sulfate in solution, and about 2 pounds of 50% Glucopon® 420 UP, with continued mixing for at least about one hour. It is beneficial to adjust the pH after addition of each subsequent element beginning with the addition of the solubility enhancing aqueous composition. pH should be adjusted to be in the range from about pH 2.5 to about pH 3.5 with a median of pH 3.0 being a reasonable target. Lowering the pH is accomplished by any reasonable means known to the skilled artisan but it is recommended to add an appropriate amount of a solubility enhancing aqueous composition; and increasing the pH can be accomplished by any means known to the skilled artisan but is recommended to add an appropriate amount of sodium hydroxide, particularly 50% sodium hydroxide.

The intent and benefit of the present aqueous paper enhancing composition, and potentially, all aqueous is to provide an aqueous solution that is substantially free of solids. However, not all aqueous paper enhancing compositions or carbonate enhancing compositions will be free or substantially free of solids.

Although specific embodiments have been described above, these embodiments are not intended to limit the scope of the present disclosure, even where only a single embodiment is described with respect to a particular feature. Examples of features provided in this disclosure are intended to be illustrative rather than restrictive unless stated otherwise. The present disclosure is intended to cover such alternatives, modifications and/or equivalents as would be apparent to a person skilled in the art having the benefit of this disclosure.

It is to be understood that the present compositions are limited only to the ranges and or limitation set forth herein and not to variations within such ranges. It is also to be understood that the terminology used herein is for the purpose of describing particular embodiments only, and is not intended to be limiting.

Further modifications and alternative embodiments of various aspects of the embodiments described in this disclosure will be apparent to the skilled artisan in view of the present disclosure. Elements and materials may be substituted for those illustrated and described herein, parts and processes may be reversed, and certain features of the embodiments may be utilized independently, all as would be apparent to one skilled in the art after having the benefit of the description. Changes may be made in the elements described herein without departing from the spirit and scope of the appended claims.

EXAMPLES

Example 1. Preparation of an ammonium sulfate stock solution for a solubility enhancing aqueous composition: Into a volumetrically calibrated common 250 mL beaker, 90 mL of deionized $H_2O$ was added. 20 grams of $(NH_4)_2SO_4$ was completely dissolved into the deionized water. The total volume was brought to 100 mL using additional deionized water. 20 grams $(NH_4)_2SO_4$ per 100 mL $H_2O$ is a 20% solution and is a 1.51 M solution.

Example 2. Direct preparation of a second solution for the preparation of a solubility enhancing aqueous composition without the prior preparation of a first solution wherein the ratio of a first solution equivalent to water addition in this step is four parts water to one part first solution equivalent:
  1.15 mL of 20% $(NH_4)_2SO_4$ was added to a common 10 mL polypropylene centrifuge tube
  8.0 mL deionized water added to tube
  0.850 mL of concentrated (95-98%) sulfuric acid ($H_2SO_4$) added to tube with sufficient force to mix Example 3. Direct preparation of a second solution for a solubility enhancing aqueous composition without the prior preparation of a first solution wherein the ratio of a first solution equivalent to water addition in this step is nine parts water to one part first solution equivalent:
  0.576 mL of 20% $(NH_4)_2SO_4$ was added to a common 10 mL polypropylene centrifuge tube
  9.0 mL deionized water added to tube
  0.424 mL of concentrated (95-98%) sulfuric acid ($H_2SO_4$) added to tube with sufficient force to mix Example 4. Direct preparation of a second solution for a solubility enhancing aqueous composition without the prior preparation of a first solution wherein the ratio of a first solution equivalent to water addition in this step is nineteen parts water to one part first solution equivalent:
  0.288 mL of 20% $(NH_4)_2SO_4$ was added to a common 10 mL polypropylene centrifuge tube
  9.5 mL deionized water added to tube
  0.212 mL of concentrated (95-98%) sulfuric acid ($H_2SO_4$) added to tube with sufficient force to mix Example 5. Preparation of solubility enhancing aqueous composition samples for liquid chromatography—mass spectrometry (LC-MS) analysis: Each of Examples 2, 3 and 4, following addition of the sulfuric acid:
  the centrifugation tubes were briefly capped and vortexed to mix thoroughly
  caps were loosened to vent. It was observed that the temperatures of the centrifugation tubes were greater than ambient temperature. Such temperature was not sufficient to melt the centrifugation tubes.
  reactions were allowed to run for about 60 minutes
  after completion of the reaction time, 1 mL samples of the reacted solutions were filtered through a 0.44 micro Pall syringe filter and placed into labeled mass spectrometry vials
  vials were loaded into a Thermo Q Exactive Plus MS system with a Vanquish LC front end LC Settings:
  0.25 ml/min
  40% methanol/60% water/0.1% formic acid
  column temp 30° C.
  Thermo Accucore AQ C18 polar end cap column (150 mm×3 mm)
  Injection volumes of 20 uL
Low resolution parameters
  Full MS-SIM
  0-10 minutes
  Positive polarity
  Resolution: 70,000
  AGC Target: $3 \times 10^6$
  Max IT: 200 ms
  Scan Range: 50-700 mz High Resolution Parameters
  Full MS/dd-MS²
  0-7 minutes
  Positive polarity
Full MS: Resolution: 70,500
  AGC Target: 3×10⁶
  Max IT: 100 ms
  Scan range: 50-700 mz
dd-MS²: Resolution: 17,500
  AGC target: 2×10⁶
  Max IT: 50 ms
  Scan range: 50-700 mz
  Minimum AGC Target: 2×10³
Example 6: Laboratory Preparations of First Solutions for preparation of solubility enhancing aqueous compositions for Ion Chromatographic Quantification:
  A 24% solution of ammonium sulfate was created by adding 96 grams of ammonium sulfate to 400 grams deionized water. The solution was mixed to completely dissolve the ammonium sulfate.
  Ten (10) identical 20 mL reactions were produced:
    9.6 mL of the preceding 24% ammonium sulfate solution was added to individually labeled common 50 mL conical tubes by way of calibrated macropipette
    10.4 mL of concentrated sulfuric acid (95-98% reagent grade) was added to each tube by way of calibrated micropipette with sufficient force to thoroughly mix
    Tubes were allowed to stand loosely capped for an hour for reaction to run to completion.
Example 7: Ion Chromatography (IC) Method.
Samples from Example 6 were transferred to IC vials, diluted appropriately (1:2500) to bring the ionic concentrations into the range of testing equipment used, and ion chromatography was undertaken using the following parameters:
Ion Chromatography:
Dual Thermo Dionex Aquion
Anion Side:
Column: Dionex IonPac AS22 RFIC 4×250 mm
Mobile phase: carbonate/bicarbonate buffet at 4.8/1.2 mM
Flow: 1.2 mL/min isocratic
Suppressor: Dionex ADRS 600 4 mm
Sup. Voltage: 33 mA
Standard: IC STD for sulfate, 50-500 ppm
Anion cell: 35° C.
Anion column: 30° C.
18 minute run time
Cation Side:
Column: Dionex IonPac CS16 RFIC 5×250 mm
Mobile phase: 30 mM MSA solution
Flow: 1 mL/min isocratic
Suppressor: Dionex CDRS 600 4 mm
Sup voltage: 89 mA
Standard: IC STD for ammonium 20-100 ppm
Cation cell: 40° C.
Cation column: 35° C.
18 minute run time
All 25 uL injections
Example 8. Ion Chromatography Results.
Using the sample preparations set forth in Example 6 and the ion chromatography methods set forth in Example 7, the following results (10 samples; 2 replicates) were obtained:

| Sulfate mol/L | Ammonium mol/L |
|---|---|
| 9.1904799 | 1.6264427 |
| 8.00-13.00 | 1.45-2.01 |

Example 9: Commercial-scale Production of a Solubility Enhancing Composition First Solution Into a 500-gallon polyethylene conical-bottom tank was added 160.5 pounds (about 19.2 gallons) of deionized water. Upon addition of the water, a magnetic-driven shearing pump with an impeller was engaged, circulating the water in the tank. To the water was slowly added 50.7 pounds of pre-weighed ammonium sulfate (GAC Chemical Corp., Searsport Maine, U.S.A.) to enable solubilization of the ammonium sulfate preparing a 31.6% ammonium sulfate solution. The recirculating pump was allowed to run for about 20 minutes for this batch size. Complete solubilization of the ammonium sulfate was visually confirmed by decanting about 250 mL of solution into a PET bottle that was allowed to stand undisturbed for about 15 minutes, confirming complete solubilization.

a 50-gallon Dietrich (Corpus Christi, Texas, U.S.A.) closed-loop, stainless steel-jacketed, glass-lined reactor was pre-cooled using a CTS T-230 cooling tower (Cooling Tower Systems, Macon, Georgia U.S.A.) circulating a mixture of municipal water and sufficient sodium hypochlorite to maintain a pH from about 7.5 to about 7.8. To this reactor was added 400.6 pounds (about 26.1 gallons) of 98% sulfuric acid (Brenntag; Henderson, Kentucky U.S.A.) while a shaft-driven paddle mixer was engaged at 1700 rpm. To the sulfuric acid was rapidly added the ammonium sulfate solution and was mixed for about 20 minutes (until the reaction mixture cooled to a temperature of about 130 degrees Fahrenheit) at which time the reaction to form this first solution was complete.

Example 10: Commercial Production of a Solubility Enhancing Composition Second Solution To a one thousand gallon polyethylene conical-bottom tank is added deionized water equal to the volume or mass of the first solution. To this water is added the first solution. The resulting mixture represents a second solution of the present invention.

Example 11: Ion Chromatography Results.

Using the sample preparations set forth in Example 9 and the ion chromatography methods set forth in Example 7, the following results (averages of 3 replicates of 3 samples) were obtained:

| Sulfate mol/L | Ammonium mol/L |
|---|---|
| 10.77769681 | 1.677964718 |

Target Ranges:

| Sulfate mol/L | Ammonium mol/L |
|---|---|
| 8.00-13.00 | 1.45-2.01 |

Example 12. Preparation of an Aqueous Paper enhancing Composition (also used for the Preparation of an Aqueous Carbonate Enhancing Composition):

A 30% sodium hydroxide solution is prepared by dissolving 300 grams of sodium hydroxide per 1000 grams (1.0 L) of water;

A 50% Glucopon® 420 solution is prepared by dissolving 500 grams of Glucopon 420 per 1000 grams (1.0 L) of water;

To an appropriate mixing vessel is added 2700.98 grams of water;

To the water is added 551.60 grams of a first solution (as defined above) with slow mixing;

To the previous solution is added 276.91 grams of a 30% sodium hydroxide solution with slow mixing;

Mix the previous solution slowly for 30 minutes and, after which, adjust the pH to 3.0;

To the previous solution, slowly add 891.74 grams of copper sulfate with mixing until the copper sulfate is fully dissolved;

To the previous solution, add 5.80 grams of 50% Glucopon 420 and mix for 1 hour;

Adjust the final pH to 3.0 with sodium hydroxide.

Example 13. Commercial-scale Preparation (330 gallons of finished product) of an Aqueous Paper enhancing Composition (also used for the Preparation of an Aqueous Carbonate Enhancing Composition):

To a 500 gallon polyethylene tank was added 2,116 pounds of 17 megohm water, with mixing via circulation from a roller pump;

To the water was added 183 pounds of a solubility enhancing aqueous composition, with continued mixing;

To the prior solution was slowly added 183 pounds of 50% sodium hydroxide, with continued mixing;

To the prior solution was added 590 pounds of copper sulfate, with continued mixing to maintain the copper sulfate in solution;

To the prior solution/suspension was added 2 pounds of Glucopon 420® with continued mixing for one hour pH of the final solution is adjusted to a pH from about 2.5 to about 3.5 using additional solubility enhancing aqueous composition in the pH needs to be lowered or add sodium hydroxide if the pH needs to be increased to the target range.

We claim:

1. A carbonate enhancing composition comprising:
a solubility enhancing aqueous composition comprising an anionic component consisting essentially of sulfate ions, alone or in combination with bisulfate ions, having a concentration from about 8.00 moles per liter to about 13.00 moles per liter of the solubility enhancing aqueous composition volume; a cationic component consisting essentially of ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;
sodium hydroxide solution having a concentration of about 5% to about 7.5% volume/volume of the total aqueous phase volume of the carbonate enhancing composition; and
a sulfate selected from the group consisting of copper sulfate, silver sulfate and combinations thereof having a concentration from about 20 percent to about 26 percent mass/volume of the total aqueous phase volume of the carbonate enhancing composition.

2. A carbonate enhancing composition of claim 1 further comprising at least one surfactant selected from the group consisting of non-ionic surfactants and anionic surfactants having a concentration from about 0.05 percent to about 0.15 percent volume/volume of the total aqueous phase volume of the carbonate enhancing composition.

3. A carbonate enhancing composition of claim 2 further comprising the addition of at least one base or at least one acid to adjust the final pH of the carbonate enhancing composition in the range from about pH 2.5 to about pH 3.5.

4. A carbonate enhancing composition of claim 1, wherein the carbonate enhancing composition is substantially free of solids.

5. A carbonate enhancing composition of claim 3, wherein the carbonate enhancing composition is substantially free of solids.

6. A carbonate enhancing composition of claim 1, wherein the carbonate enhancing composition is free of solids.

7. A carbonate enhancing composition of claim 3, wherein the carbonate enhancing composition is free of solids.

8. A carbonate enhancing composition consisting of:
a solubility enhancing aqueous composition consisting of an anionic component consisting of sulfate ions, alone or in combination with bisulfate ions, having a concentration from about 8.00 moles per liter to about 13.00 moles per liter of the solubility enhancing aqueous composition volume; a cationic component consisting of ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;
sodium hydroxide solution having a concentration of about 5% to about 7.5% volume/volume of the total aqueous phase volume of the carbonate enhancing composition; and
a sulfate selected from the group consisting of copper sulfate, silver sulfate and combinations thereof having a concentration from about 20 percent to about 26 percent mass/volume of the total aqueous phase volume of the carbonate enhancing composition.

9. A carbonate enhancing composition of claim 8, wherein the sodium hydroxide is a dilute sodium hydroxide of about 20 percent to about 50 percent.

10. A carbonate enhancing composition consisting of:
a solubility enhancing aqueous composition consisting of an anionic component consisting of sulfate ions, alone or in combination with bisulfate ions, having a concentration from about 8.00 moles per liter to about 13.00 moles per liter of the solubility enhancing aqueous composition volume; a cationic component consisting of ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;
sodium hydroxide solution having a concentration of about 5% to about 7.5% volume/volume of the total aqueous phase volume of the carbonate enhancing composition;
a sulfate selected from the group consisting of copper sulfate, silver sulfate and combinations thereof having a concentration from about 20 percent to about 26 percent mass/volume of the total aqueous phase volume of the carbonate enhancing composition;

at least one surfactant selected from the group consisting of non-ionic surfactants and anionic surfactants having a concentration from about 0.05 percent to about 0.15 percent volume/volume of the total aqueous phase volume of the carbonate enhancing composition; and at least one base or at least one acid to adjust the final pH of the carbonate enhancing composition in the range from about pH 2.5 to about pH 3.5.

11. A carbonate enhancing composition of claim 9, wherein the carbonate enhancing composition is substantially free of solids.

12. A carbonate enhancing composition of claim 10, wherein the carbonate enhancing composition is substantially free of solids.

13. A carbonate enhancing composition of claim 9, wherein the carbonate enhancing composition is free of solids.

14. A carbonate enhancing composition of claim 10, wherein the carbonate enhancing composition is free of solids.

15. A carbonate enhanced composition consisting of a carbonate selected from the group consisting of at least one calcium carbonate, at least one silver carbonate, at least one organic compound carbonate and mixtures thereof; and a carbonate enhancing composition of claim 9.

16. A carbonate enhanced composition of claim 15, wherein about one and one-half pounds to about ten pounds of carbonate enhancing mixture is added per United States ton of the carbonate selected from the group consisting of at least one calcium carbonate, at least one silver carbonate, at least one organic compound carbonate and mixtures thereof.

17. A carbonate enhanced composition consisting of a carbonate selected from the group consisting of at least one calcium carbonate, at least one silver carbonate, at least one organic compound carbonate and mixtures thereof; and a carbonate enhancing composition of claim 10.

18. A carbonate enhancing composition of claim 10, wherein the sodium hydroxide is a dilute sodium hydroxide of about 20 percent to about 50 percent.

* * * * *